UNITED STATES PATENT OFFICE.

CARL W. SCHULTZE, OF BUFFALO, NEW YORK, ASSIGNOR TO THE CLARINE COMPANY, OF BUFFALO, NEW YORK, A CORPORATION OF NEW YORK.

COMPOUND FOR PURIFYING WATER.

935,695.　　　　Specification of Letters Patent.　　Patented Oct. 5, 1909.

No Drawing.　　Application filed July 16, 1908.　Serial No. 443,787.

*To all whom it may concern:*

Be it known that I, CARL W. SCHULTZE, a citizen of the United States, residing at Buffalo, in the county of Erie and State of New York, have invented a new and useful Compound for Purifying Water, of which the following is a specification.

My invention relates to a compound for purifying water.

The object of my invention is to provide a water-purifying compound so that the same may be prepared by any maker of tablets or disks and may be used by any unskilled person in removing pathogenic germs and other foreign matter from water containing sufficient calcium or magnesium salts to react with the chemical employed.

My invention is particularly applicable to purifying water for drinking purposes, for household use, for laboratory and hospital use, and in general for uses where the presence of pathogenic germs or other foreign matter is injurious. Incident to the main purpose of removing pathogenic germs is the advantage of the removal of the ordinary insoluble substances commonly present in water in the form of filth and silt which, while not possessing the injurious qualities of the germs, are, nevertheless, undesirable.

In general terms, my invention consists in the preparation of a tablet containing the ingredients essential to a stated volume of water, the constituents of which in combination with the lime in the water produce flocculent masses or accretions about the bacteria and other suspended substances, so enmeshing them that they are removable by a rapid filtration; and then removing such enmeshed substances by a method of filtering so simple and sanitary as to render failure or mistake practically impossible even in the hands of the most unskilled.

It will be appreciated that, in the employment of any water purification process for domestic and similar uses involving chemical action or reaction, the minimum amount of knowledge or judgment must be left to the user; or, in other words, as is sometimes said of a machine in the hands of the unskilled, the process must be "fool-proof," or as nearly so as the same can be made. First of all, then, the question of judgment or skill in preparing the compound must be eliminated, and the question of quantity or measurement of the quantity to be used must also be eliminated. To this end I prepare a tablet composed of sulfate of aluminum, about four grains; kaolin, about six grains; starch, about eight grains. The starch acts as a binder for the tablet and as a disintegrator when the tablet is moistened.

The method of making the tablet need not be described, since a chemist or tablet maker familiar with the art may make the same, the only direction necessary being that the tablet shall be friable and capable of being used as hereafter described. The definite, fixed unit thus in friable tablet form, is the proper amount of chemical compound to add to an ordinary gallon bottle of water,— the ordinary unit receptacle of the ordinary household. The tablet is then rubbed to a smooth cream with a small amount of water, about a teaspoonful, and is then added to the gallon bottle of water, with the exercise of no further skill than to shake the bottle; then wait about five minutes for the reaction and enmeshing to take place. An ordinary funnel is then moistened on the inside, to prevent the cotton from floating when the water is poured in, and a ball of absorbent cotton the size of an apple placed within the funnel, and the funnel inserted in a second gallon bottle. The water is now poured from the first bottle onto the cotton, slowly at first, and then to fill the funnel. The filtration is rapid, and the funnel being kept full, the gallon of water is quickly filtered. The funnel is removed, the cotton thrown away, and the water is ready for use.

I claim:

1. A compound for treating lime bearing waters which consists of an adapted unit of a soluble salt capable of forming a gelatinous precipitate and an insoluble powder of such fineness that the particles will remain suspended in the water for a considerable length of time.

2. A tablet for treating lime bearing waters which consists of an adapted unit of a soluble salt capable of forming a gelatinous precipitate, an insoluble powder of such fineness that the particles will remain suspended for a considerable length of time, and a binder.

In testimony that I claim the foregoing invention, I have hereunto set my hand in the presence of two witnesses.

CARL W. SCHULTZE.

Witnesses:
ETHEL A. KELLY,
A. N. MACOMBER.